United States Patent
Beimes et al.

(10) Patent No.: US 9,781,267 B2
(45) Date of Patent: Oct. 3, 2017

(54) SYSTEMS AND METHODS FOR HANDLING AND ROUTING INCOMING COMMUNICATION REQUESTS

(71) Applicant: ViziCall, LLC, Henderson, NV (US)

(72) Inventors: Zach Beimes, Henderson, NV (US); Spencer Peller, Secaucus, NJ (US)

(73) Assignee: ViziCall, LLC, Henderson, NV (US)

( * ) Notice: Subject to any disclaimer, the term of this patent is extended or adjusted under 35 U.S.C. 154(b) by 564 days.

(21) Appl. No.: 14/280,166

(22) Filed: May 16, 2014

(65) Prior Publication Data

US 2015/0334235 A1    Nov. 19, 2015

(51) Int. Cl.
| | | |
|---|---|---|
| H04M 3/00 | (2006.01) | |
| H04M 5/00 | (2006.01) | |
| H04M 3/51 | (2006.01) | |
| H04M 3/523 | (2006.01) | |
| G06Q 10/10 | (2012.01) | |
| H04M 3/50 | (2006.01) | |
| H04Q 5/18 | (2006.01) | |

(52) U.S. Cl.
CPC ...... *H04M 3/5191* (2013.01); *G06Q 10/1095* (2013.01); *H04M 3/50* (2013.01); *H04M 3/5233* (2013.01); *H04M 3/5235* (2013.01); *H04Q 5/18* (2013.01); *H04M 2203/408* (2013.01)

(58) Field of Classification Search
CPC ............... H04M 3/5235; H04M 3/493; H04M 2203/408
USPC ........................................ 379/265.02, 265.09
See application file for complete search history.

(56) References Cited

U.S. PATENT DOCUMENTS

| | | | | |
|---|---|---|---|---|
| 6,100,891 A | * | 8/2000 | Thorne .................. | H04M 3/51 379/267 |
| 2002/0022986 A1 | * | 2/2002 | Coker .................... | G06Q 30/02 717/115 |
| 2004/0080535 A1 | * | 4/2004 | Lueckhoff ............. | G06Q 10/10 715/758 |
| 2005/0078657 A1 | | 4/2005 | Huey | |
| 2007/0081658 A1 | | 4/2007 | Blohm et al. | |
| 2007/0211881 A1 | * | 9/2007 | Parker-Stephen .. | H04M 3/5133 379/265.01 |
| 2009/0221274 A1 | | 9/2009 | Venkatakrishnan et al. | |
| 2010/0226490 A1 | * | 9/2010 | Schultz ............... | H04M 3/5233 379/265.09 |
| 2011/0135084 A1 | | 6/2011 | Moore et al. | |

FOREIGN PATENT DOCUMENTS

WO    WO 2013/154528 A1    10/2013

OTHER PUBLICATIONS

The International Search Report and Written Opinion issued by the ISA/RU for corresponding application PCT/US2015/029607, dated Aug. 20, 2015, 6 pages.

* cited by examiner

*Primary Examiner* — Nafiz E Hoque
(74) *Attorney, Agent, or Firm* — Erin C. Wills; Smith Moore Leatherwood LLP

(57) ABSTRACT

The present disclosure provides systems and methods for routing incoming communications, such as calls, to a customer service representative or live agent. Specifically, the present disclosure provides a communication routing platform that can forward calls from multiple phones numbers to one or more call centers or live agents as well while simultaneously forwarding instructions for handling the calls.

17 Claims, 19 Drawing Sheets

ROUTING & NOTIFICATIONS
140

Please provide the business hours for this phone script:

Morning Hours:     Afternoon/Evening Hours:

| DAY | OPEN | CLOSE | OPEN | CLOSE | | |
|---|---|---|---|---|---|---|
| Mon | 8:00am | 12:00pm | 12:00pm | 5:00pm | or | Select Hours |
| Tue | 8:00am | 12:00pm | 12:00pm | 5:00pm | or | Select Hours |
| Wed | 8:00am | 12:00pm | 12:00pm | 5:00pm | or | Select Hours |
| Thur | 8:00am | 12:00pm | 12:00pm | 5:00pm | or | Select Hours |
| Fri | 8:00am | 12:00pm | 12:00pm | 5:00pm | or | Select Hours |
| Sat | 8:00am | 12:00pm | 12:00pm | 5:00pm | or | Select Hours |
| Sun | 8:00am | 12:00pm | 12:00pm | 5:00pm | or | Select Hours |

142

During business hours where should we send calls?
- YesTrak Call Center or
( 123 ) 456 - 2359

144

During after hours where should we send calls?
- YesTrak Call Center or
( 123 ) 456 - 2359

146

Legally, all callers need to be notified that a phone call is being monitored or recorded. You can use our standard notification, or customize your own:
- I'll use the standard notification.
- I'll use my own audio.
  *Please upload this file*.

148

When do you want to be notified of activity
- Upon all calls received
- Upon any action taken by agent

150

How do you want to be notified of activity?

Email:
152 [ johndoe@happysmiles.com ]
[ johndoe@gmail.com ]

SMS/TEXT
( 123 ) 456 - 2359
( 123 ) 456 - 2359
154

FIG. 7

HELP US WITH THE SCRIPT

"Hi, my name is (agent name), how may I help you today?"
I'm sorry, INSERT NOT AVAILABLE EXCUSE HERE. "

"May I please start with your phone number in case we get disconnected?"
CALLER PROVIDES PHONE NUMBER

"May I please have your first name?"
CALLER PROVIDES FIRST NAME

"May I please have your last name?"
CALLER PROVIDES LAST NAME

"May I please have the message you'd like me to take?
CALLER PROVIDES MESSAGE

"I will send your message through now. My name is (agent name), and it's been a pleasure assisting you. Is there anything else we can do for you today? Thanks for calling and have a great day!"
*Agent will then send through message*

Are there any key alerts our agents should be aware of?
INSERT KEY BUSINESS ALERTS HERE. (We're offering How should our agents handle any objection a caller may raise?
INSERT THE EXACT RESPONSE DESIRED HERE.

FIG. 8

HELP US WITH THE SCRIPT — 170

○ "Hello, my name is (agent name), and my job is to gather some quick information so we can  INSERT DESIRED ACTION HERE." } 172

"May I please start with your phone number in case we get disconnected?" CALLER PROVIDES PHONE NUMBER "May I please have your first name?"
CALLER PROVIDES FIRST NAME "May I please have your last name?"
CALLER PROVIDES LAST NAME "May I please have your email address?"
CALLER PROVIDES EMAIL ADDRESS

} 174

INSERT QUESTION 1 HERE.
CALLER ANSWERS QUESTION

INSERT QUESTION 2 HERE.
CALLER ANSWERS QUESTION

INSERT QUESTION 3 HERE.
CALLER ANSWERS QUESTION

} 176

○ "Great. Thank you, for providing me with information. That's all I needed. You can expect  INSERT NEXT STEPS HERE."

Thank you. My name is (agent name), and it's been a pleasure assisting you. Is there anything else I can do for you today? Thanks for calling and have a great day!"

Are there any key alerts our agents should be aware of?
INSERT KEY BUSINESS ALERTS HERE. (We're offering How should our agents handle any objection a caller may raise?
INSERT THE EXACT RESPONSE DESIRED HERE.

HELP US WITH THE SCRIPT ⟵ 180

● "Hello, my name is (agent name), and my job is to get you scheduled for your INSERT APPOINTMENT TYPE HERE." } 182

● "May I please start with your phone number in case we get disconnected?" CALLER PROVIDES PHONE NUMBER ● "May I please have your first name?"
CALLER PROVIDES FIRST NAME ● "May I please have your last name?"
CALLER PROVIDES LAST NAME
} 184

● "What day were you looking to schedule your INSERT APPOINTMENT TYPE HERE." } 182

Please choose a calendar to book these appointments on:

Select calendar

Default

Dr. Jones
} 186

"Thank you. I have you in the calendar for (day/time of appointment). Is that correct?

● Thank you. My name is (agent name), and it's been a pleasure assisting you. Is there anything else I can do for you today? Thanks for calling and have a great day!"

Are there any key alerts our agents should be aware of?
INSERT KEY BUSINESS ALERTS HERE. (We're offering How should our agents handle any objection a caller may raise?
INSERT THE EXACT RESPONSE DESIRED HERE.
} 188

SYSTEMS AND METHODS FOR HANDLING AND ROUTING INCOMING COMMUNICATION REQUESTS

FIELD

The present disclosure relates in general to routing calls or other incoming communications to third-party communication support centers or agents. Specifically, the present disclosure relates to systems and methods for routing and handling such calls or other incoming communication according to one or more communication handling protocols defined by a client.

BACKGROUND

Customer support centers, such as call centers, are often employed by large companies to handle incoming calls from customers, potential customers, and the like. Typically, such call center services are costly and are designed to handle high call volume. Furthermore, the process of setting up such a call center service for a company requires the distribution of phone scripts to a call center representative, who then trains a group of call agents according to the phone scripts. As a result, editing phone scripts is a drawn out process that requires many interactions and man-hours. The high costs and complex procedures involved with using a call center to field incoming calls makes such services impractical for small entities such as small businesses, entrepreneurs, and small organizations.

However, these small entities may need such customer support services to help them efficiently run and grow their businesses. For example, a small business may require someone to answer the phone during afterhours, or during busy hours when their employees cannot always answer calls. In such cases, potential business or leads may be lost if calls are unanswered or sent to voicemail. Thus a solution is needed to allow such entities to access customer support services without the high costs of employing a large call center.

SUMMARY

In one aspect of the present disclosure, a processor-implemented method of receiving and routing calls to a call center or agent comprises receiving, by a communication routing platform, an incoming call from a caller, wherein the incoming communication is directed to a central platform-provided phone number. The method further includes identifying, by the communication routing platform, an account associated with the platform-provided phone number. The method also includes carrying out, by the communication routing platform, a primary communication handling protocol associated with the account or central platform provided phone number, wherein the primary communication handling protocol comprises one or more next steps for routing the incoming call. The method further includes sending, by the communication routing platform, one or more notifications to a contact associated with the account, the one or more notifications comprising data generated during carrying out of the primary communication handling protocol.

In another aspect of the present disclosure, a processor-implemented system for routing communications comprises a communication router configured to receive an incoming communication from a sender, wherein the incoming communication is directed towards an entity. The communication router is further configured to identify an account associated with the entity, and carry out a primary communication handling protocol associated with the account, wherein the primary communication handling protocol comprises one or more next steps for routing the incoming communication. The communication router is also configured to send one or more notifications to a contact associated with the account, the one or more notifications comprising data generated during carrying out of the primary communication handling protocol.

In yet another aspect of the present disclosure, a processor-implemented method of receiving and routing communication requests comprises receiving, by a communication routing platform, an incoming communication from a sender, wherein the incoming communication is directed towards an entity. The method further includes identifying, by the communication routing platform, an account associated with the entity. The method also includes carrying out, by the communication routing platform, a primary communication handling protocol associated with the account, wherein the primary communication handling protocol comprises one or more next steps for routing the incoming communication. The method also includes sending, by the communication routing platform, one or more notifications to a contact associated with the account, the one or more notifications comprising data generated during carrying out of the primary communication handling protocol.

BRIEF DESCRIPTION OF THE DRAWINGS

The accompanying figures, which are included as part of the present specification, illustrate various implementations of the presently disclosed systems and methods. Together with the general description given above and the detailed description of the implementations given below, the figures serve to explain and teach the principles of the present systems and methods.

FIG. 7 illustrates a general call handling protocol editing interface for use by the user to generate or edit a portion of a call handing protocol, in accordance with example embodiments of the present disclosure;

FIG. 8 illustrates a "take a message" script editing interface for a "take a message" type script, in accordance with example embodiments of the present disclosure;

FIG. 9 illustrates a "gather information" script editing interface for a "gather information" type script, in accordance with example embodiments of the present disclosure;

FIG. 10 illustrates a "book appointment" script editing interface for a "book appointment" type script, in accordance with example embodiments of the present disclosure;

DETAILED DESCRIPTION

The present disclosure provides systems and methods for routing incoming communications, such as calls, to a customer service representative or live agent. Specifically, the present disclosure provides a communication routing platform that can forward calls from multiple phones numbers to one or more call centers or live agents while simultaneously forwarding instructions for handling the calls. The following description illustrates the techniques of the present disclosure with reference to telephonic applications of the system involving callers. It should be noted that the presently disclosed techniques are equally applicable for other modes of communication such as video calls, instant messaging, and the like. Thus, the terms "call", "caller", etc., are merely illustrative of a broad class of communication senders used to illustrate the present techniques in an easy to understand manner, rather than being limiting of its applications. Other application specific terms, such as "voice over IP (VoIP)", "telephony", "phone number", "phone call", and the like are also used for illustrative purposes, and can be replaced with their appropriate counterparts for applications involving other modes of communication as described above. The terms "client" and "entity" are interchangeable and any mention of "user" refers to a representative associated with a client or entity.

Figure 1:
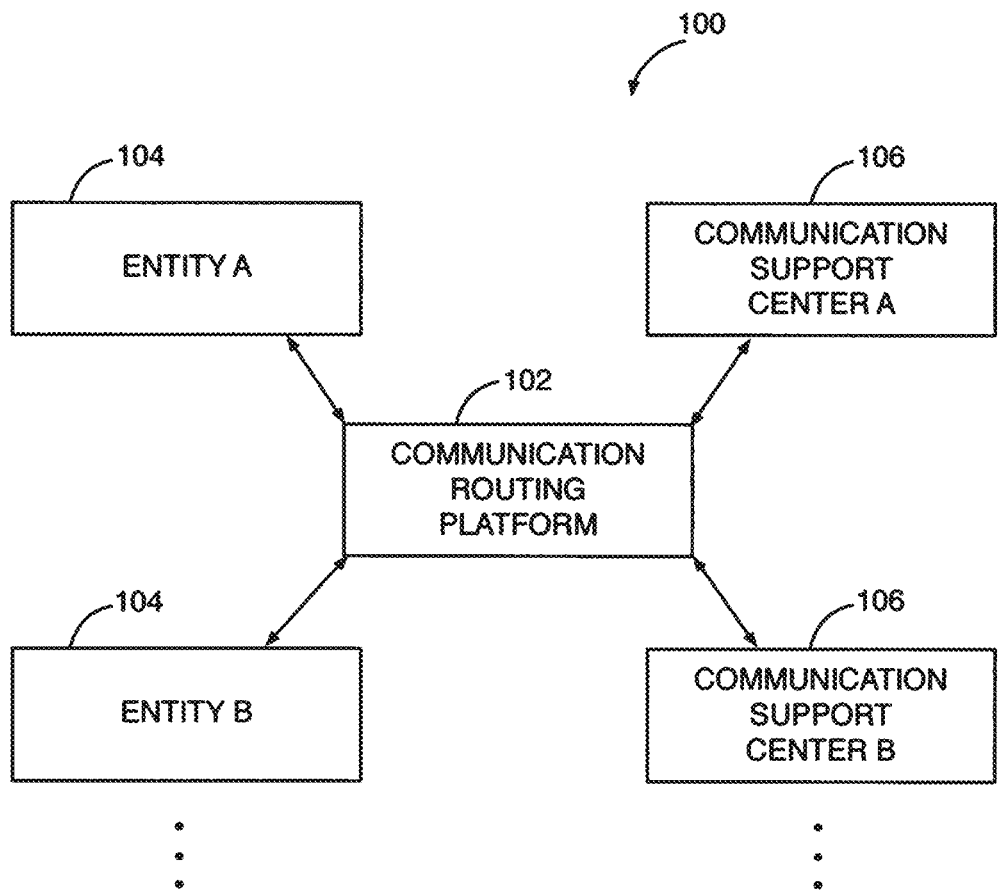
FIG. 1 illustrates a communication routing system for routing incoming communications received by an entity to a live agent, in accordance with example embodiments of the present disclosure.

FIG. 1 illustrates a communication routing system 100 for routing incoming communications received by an entity to a live agent, in accordance with example embodiments of the present disclosure. The communication routing system 100 includes a communication routing platform 102, which connects incoming communications received by one or more entities 104 to one or more support centers 106 via internet telephony and a plurality of routing protocols. In certain example embodiments, the entities 104 may include businesses, schools, agencies, individuals, and any other entity configured to receive electronic and/or telephonic communications. Examples of such communications include telephone calls, video calls, text-based instant messages, and the like. In a prominent embodiment, an entity 104 may receive phone calls placed by callers which are routed to the communication support centers 106. The communication support centers 106 are then put into communication with the callers. In certain example embodiments, such as embodiments in which the incoming communication is in the form of a telephone call, the communication support center 106 may be a call center having live agents. The incoming calls may be received centrally and then delegated to a live agent. The call center may be a traditional call center in which the live agents are centrally located, or a remote call center in which the live agents are dispersed or remotely located. In certain example embodiments, the communication support centers 106 are replaced with individual live agents, in which incoming communications are directly received by an individual live agent. The live agent is then in communication with the caller. In certain example embodiments, the communication protocol between the entities 104 and the communication routing platform 102 is a traditional telephonic protocol (landline or cellular) or an Internet telephonic protocol such as voice over IP (VoIP). In certain example embodiments, the communication between the communication routing platform 102 and the communication support centers 106 is VoIP.

Figure 2:
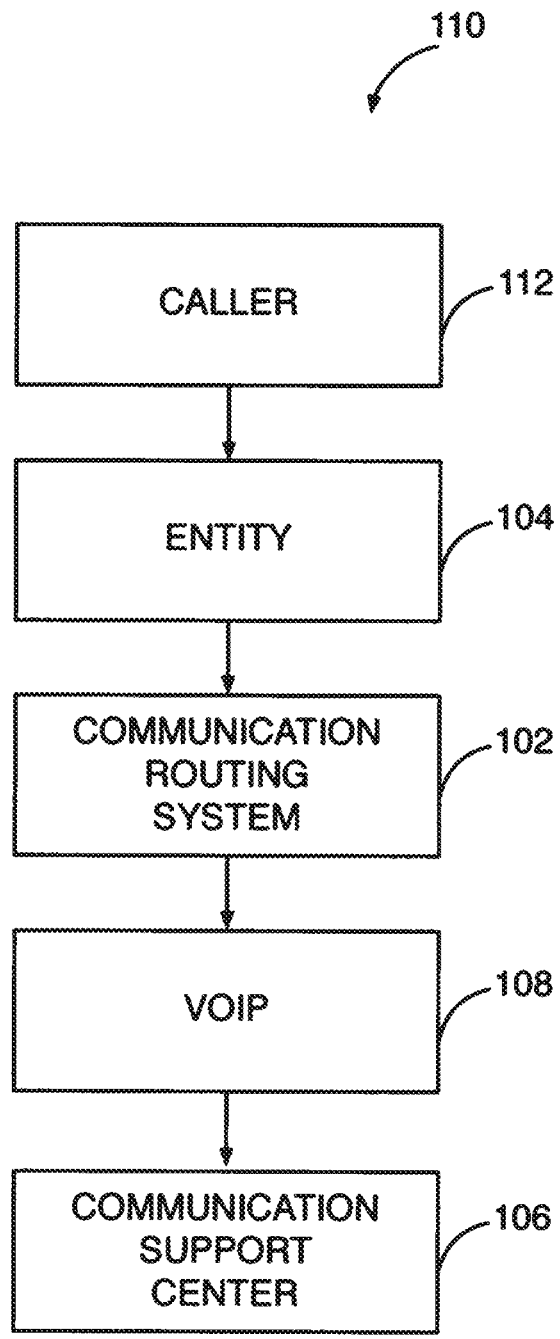
FIG. 2 is a high-level block diagram of the communication routing system, illustrating a flow of communication, in accordance with example embodiments of the present disclosure.

FIG. 2 is a high-level block diagram 110 of the system 100, illustrating a flow of communication, in accordance with example embodiments of the present disclosure. A caller 112 initiates communication with an entity 104 by dialing the entity's phone number. In certain example embodiments, the phone number is a traditional phone number provided by a phone service and used by the entity 104 as a direct line of communication. In such embodiments, the phone number is set by the entity 104 to forward to an interne-based phone number when call routing is desired. When call routing is not desired, the phone number is not forwarded. In certain example embodiment, the internet-based phone number is provided by the communication routing system 102 as a unique identifier of the entity 104 from which the call is being forwarded. Forwarding of the call to the internet-based phone number connects the call to the communication routing system 102. In certain example embodiments, the phone number of the entity 104 and as dialed by the caller 112 is already an internet-based phone number that goes directly to the communication routing system 102. In certain example embodiments, telephonic capabilities of the communication routing system 102 are provided by a third party internet telephony provider, which enables the communication routing system to receive the call and forward the call on to the communication support center 106. In other example embodiments, telephonic capabilities of the communication routing system 102 are built natively into the communication routing system 102. The communication routing system 102 then routes the call to an appropriate communication support center 106 via a VoIP service 108. A live agent at the communication support center 106 is then in communication with the caller 112 and communicates with the caller 112 according to one or more scripts associated with the specific entity 104.

When a call is routed to a live agent, whether the live agent is within the communication support center 106 or independent, a script for handling the call is also forwarded to the live agent from the communication routing system 102. The script contains instructions for handling the call and interacting with the caller 112. In certain example embodiments, the script is uniquely associated with the internet-based phone number from which the call was routed and thus automatically pulled from the communication routing system 102 when routing a call from that internet-based phone number. In certain example embodiments, during the call with the caller 112, the live agent collects various information or data, such as contact information, general information, appointment information, notes, call recording and any other information to be collected from the caller 112 or made by the live agent. This generated data gets sent back to the communication routing system 102, and the communication routing system 102 sends the data to the entity 104. The generated data can be delivered to the entity 104 in a number of ways, including but not limited to via email, SMS, notification, account update, and the like.

Figure 3:
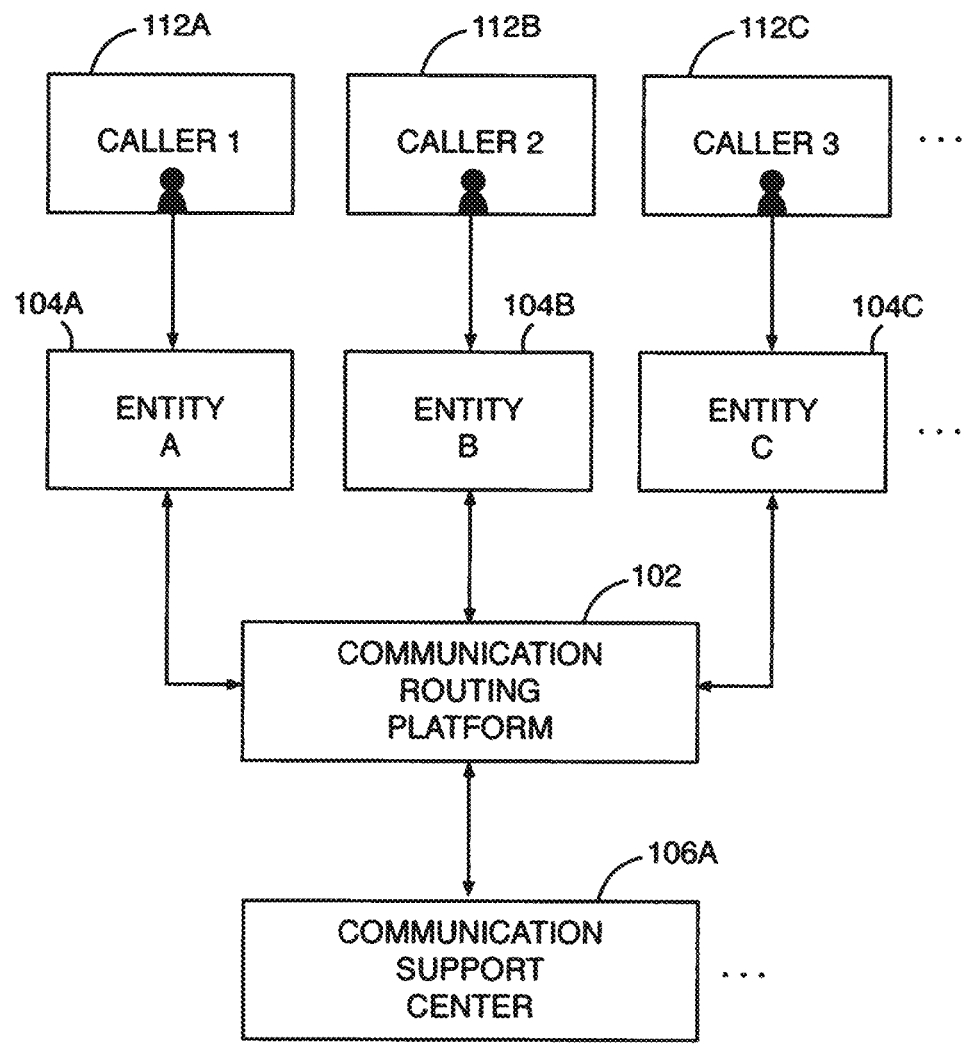
FIG. 3 illustrates the routing of calls from a plurality of callers for a plurality of entities to a communication support center, in accordance with example embodiments of the present disclosure.

In certain example embodiments, the communication routing platform 102 is configured to route a plurality of calls for a plurality of entities 104. FIG. 3 illustrates the routing of calls from a plurality of callers 112 for a plurality of entities 104 to a communication support center 106, in accordance with example embodiments of the present disclosure. Specifically, referring to FIG. 3, a first caller 112a places a call to a first entity 104a, and the call is forwarded to the communication routing system 102. Likewise, a call from a second caller 112b to a second entity 104b is forwarded to the communication routing system 102, and a call from a third caller 112c to a third entity 104c is forwarded to the communication routing system 102. In certain example embodiments, the communication routing system 102 receives all of these calls and routes them to a first communication support center 106a. In certain example embodiments, the first communication support center 106a distributes these calls to one or more live agents, who are put in communication with the respective callers 112. In certain example embodiments, the calls may be routed to more than one communication support center 106. In certain example embodiments, a call may be routed to a specific communication support center 106 based on one or more parameters, such as language, region, and the like.

Figure 4:
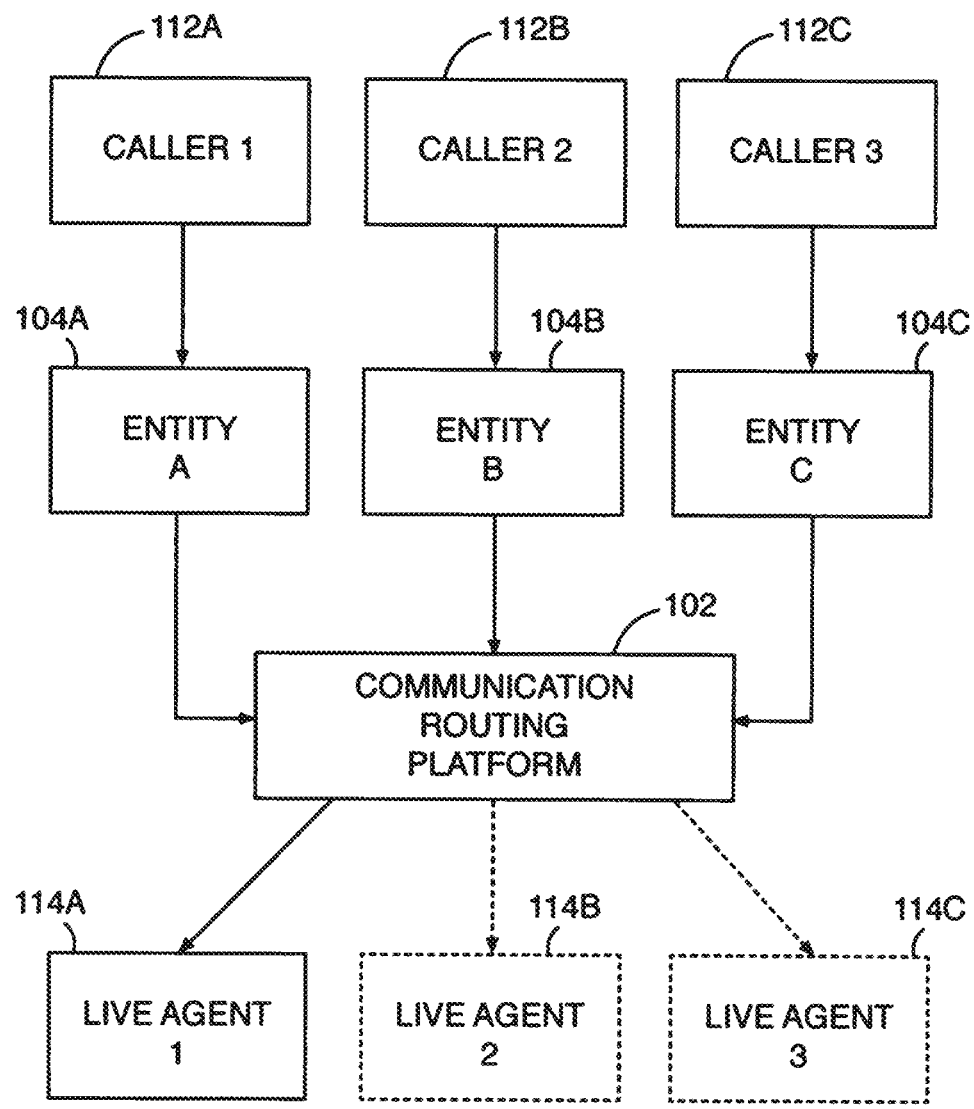
FIG. 4 illustrates the routing of calls from a plurality of callers for a plurality of entities to one or more independent live agents, in accordance with example embodiments of the present disclosure.

FIG. 4 illustrates the routing of calls from a plurality of callers 112 for a plurality of entities 104 to one or more independent live agents 114, in accordance with example embodiments of the present disclosure. In example embodiments, when the communication routing system 102 receives a call, it forwards the call to one of the one or more independent live agents 114. In one example embodiment, the communication routing system 102 routes all the calls from all the callers 112 to a first independent live agent 114a. In another example embodiment, the communication routing system 112 routes the calls from the callers 112 to a plurality of independent live agents 114a, 114b, 114c. In certain example embodiments, the calls may be distributed amongst the plurality of independent live agents 114 according to a random selection protocol based on availability, a round-robin selection scheme, or the like. In other example embodiments, the calls are distributed amongst the plurality of independent live agents 114 based on one or more parameters of the caller 112 or the associated entity, such as but not limited to language or region.

Figure 5:
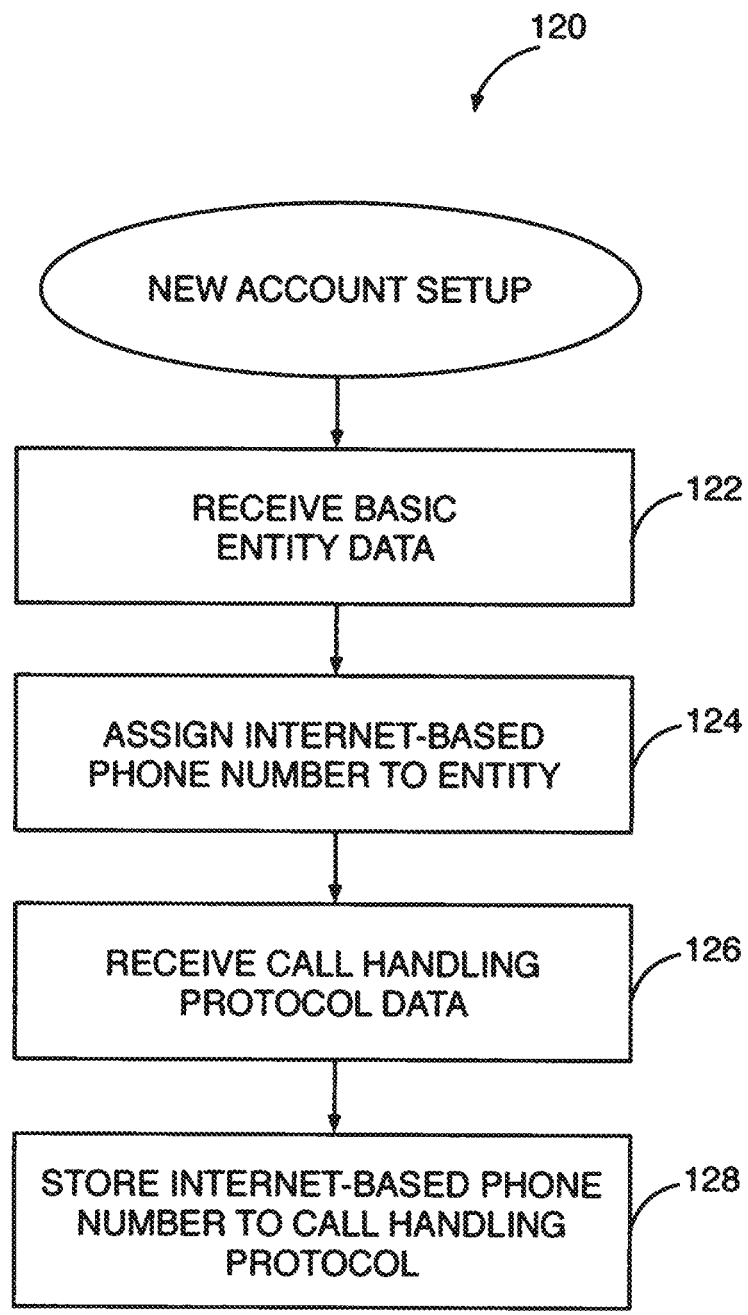
FIG. 5 is a high-level flow-chart illustrating a basic process of generating an account and call handling protocol for an entity within the communication routing platform, in accordance with example embodiments of the present disclosure.

Prior to performing any call routing, each of the entities 104 must set up an account within the communication routing platform 102. The account includes basic information regarding the entity, associated phone numbers, scripts for the live agents, and various call handling protocols. FIGS. 5-11 are directed towards handling account setups for entities 104. Specifically, FIG. 5 is a high-level flow-chart illustrating a basic process of generating an account and call handling protocol 120 for an entity 104 within the communication routing platform 102, in accordance with example embodiments of the present disclosure. The process 120 includes receiving, by the communication routing platform 120, basic information regarding the entity 104 (step 122). In certain example embodiments, this basic information is provided by the entity 104 (e.g., a user representing the entity). The basic information may include the entity type, entity name, address, primary contact information, time zone, a description of the entity, and the like. This information is stored in memory at the communication routing platform 102 and forwarded to the live agent when a call for this entity 104 is routed to that live agent. Thus, the live agent has access to the information if needed. In certain example embodiments, the basic information is collected via a client-side interface, through which a user representing the entity 112 can enter in the information. The client-side interface is provided online and accessible to the user via their own computing device (e.g., computer, laptop, smartphone, mobile device). The basic information provided can be collectively referred to as "basic entity data".

The process 120 further includes assigning, by the communication routing platform 102, one or more internet-based phone number to the entity 104 (step 124). In certain example embodiments, the internet-based phone number is provided by a third party internet telephony provider. In other example embodiments, the communication routing platform 102 is also a native Internet telephony provider and directly provides the internet-based phone number. In certain example embodiments, each of the one or more internet-based phone numbers is tied to the basic entity data for the specified entity 104. In certain example embodiments, the entity 104 can set their phones to forward to the one or more internet-based phone numbers to initiate use of the communication routing platform 102.

In certain example embodiments, each of the one or more internet-based phone numbers is associated with a specific call handling protocol, such as a script. Thus, the process 120 includes collecting, by the communication routing platform 102, call handling protocol data for each internet-based phone number (step 126). Similarly to the basic entity data, call handling protocol data is collected via a client-side interface, through which a user representing the entity 112 can enter in the information, thus generating a call handling protocol. The call handing protocol may include machine-readable instructions regarding how to route the call. The call handling protocol may also include a phone script for a call agent to use when answering the call. In certain example embodiments, the script is forwarded to a live agent when a call from the respective internet-based phone number is forwarded to the live agent. Various script templates are provided in FIGS. 7-10, and will be discussed below with respect to such.

Referring still to FIG. 5, the process 120 further includes storing, by the communication muting platform, the call handing protocol and the associated internet-based phone number in memory (step 128). Thus, the corresponding call handling protocol is automatically pulled when a call for an internet-based phone number is received, and scripts are routed with the call to a live agent.

Figure 6:
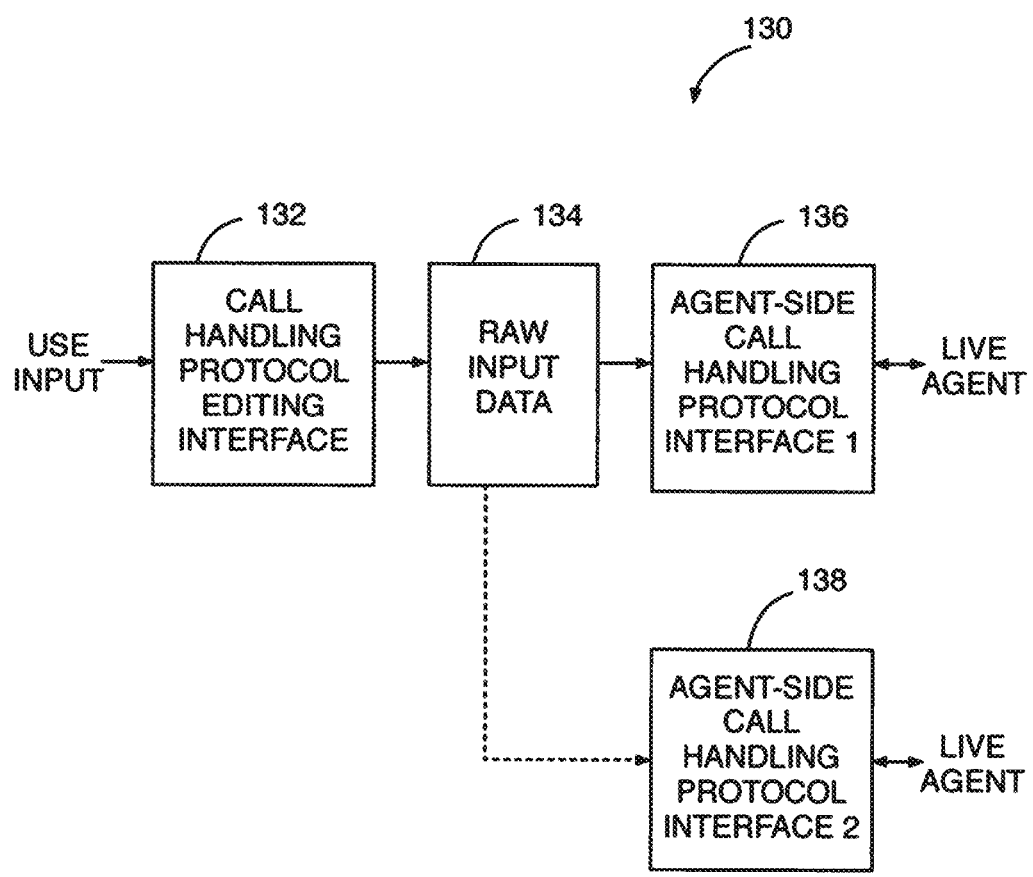
FIG. 6 is a block diagram illustrating the passing of call handling protocol data to a live agent, in accordance with example embodiments of the present disclosure.

FIG. 6 is a block diagram illustrating the passing of call handing protocol data to a live agent, in accordance with example embodiments of the present disclosure. In certain example embodiments, and as described above, a user representing an entity inputs certain call handling information into a client-side call handling protocol data collection interface 132. In certain example embodiments, the call handing protocol data collection interface 132 includes a plurality of prompts and corresponding input fields for the user to populate accordingly. FIGS. 7-10 illustrate examples of the call handling protocol data collection interface 132, and will be discussed below with respect to such. Referring still to FIG. 6, the user input into the call handing protocol data collections interface 132 is transformed into a set of raw input data 134. The raw input data 134 is an extraction of the user inputs into the call handing protocol data collection interface 132 in a machine passable form. In certain example embodiments, the raw input data 134 is sent to the live agent via an Application Programming Interface (API), in which the raw input data 134 populates a first agent-side interface 136, from which the live agent can access the call handling protocol. In certain example embodiment, the agent-side interface 136 is a pop screen having an agent-side format which may be different than the client-side interface 132. The pop screen is appropriately populated with the raw input data in the agent-side format. In such an embodiment, the pop screen is a legacy format used by the particular live agent or a communication support center. The same raw input data 134 can be sent to a second live agent or communication support center having a second client-side interface 138 which may differ in format from the first agent-side interface 136. In certain other example embodiments, the communication routing platform sends the call handling protocol data to the one or more live agents already in a communication routing platform format. Thus, the call handling protocol data can either be forwarded to a live agent in raw data form to populate an interface on the agent end, or the call handling protocol data can be pre-formatted into an interface and sent to the live agent.

In certain example embodiments, the user can edit or update the call handling protocol data at any time by accessing the client-side interface 132. This automatically updates the raw input data 134. Thus, the next time the call handing protocol is forwarded to a live agent, the most recently updated version is used. This allows the user to update the call handing protocol and deploy the updated protocol immediately.

FIG. 7 illustrates a general call handling protocol editing interface 140 for use by the user to generate or edit a portion of a call handing protocol, in accordance with example embodiments of the present disclosure. In certain example embodiments, the general call handling protocol editing interface 140 includes a business hours input prompt 142, in which the user can input the hours of operation for their entity for each day of the week. The interface 140 also includes a business hours forwarding prompt 142, in which the user can set whether to forward calls received through to the communication routing platform or to an alternate number. The interface 140 also includes an afterhours forwarding prompt 144, in which the user can set whether to forward calls received through to the communication routing platform or to an alternate number. The user can also designate the alternate forwarding number here.

The interface also includes a phone recording notification prompt 148, in which the user can choose to use a standard notification recording or upload a custom notification recording. The notification notifies the caller that the call is being recorded. In certain example embodiments, the interface 140 includes one or more call alert conditions 150 from which the user can choose. For example, the user can choose to receive an alert every time a call is received. The user can also choose to receive an alert when an action is taken by an agent. In certain example embodiments, there may be more or less alert options than those provided herein as examples.

The interface 140 may also include one or more alert email prompts 152, in which the user can enter an email address to which alerts are forwarded. Similarly, the interface 140 may include one or more alert SMS/Text prompts 154, in which the user can enter a phone number to which alerts are sent. The example interface 140 provides a sampling of the types of information collected from a user in order to generate a portion of a call handling protocol. This portion of the call handling protocol is not served to the live agent when a call comes in. Rather, this portion of the protocol provides program instructions to the communication routing platform for technical parameters of handing the call. In practice, the interface 140 may include many other and/or different types of information collecting prompts than those illustrated in FIG. 7.

Portions of the call handling protocol which are forwarded to the live agent along with the call are called scripts. Scripts provide live agents with the information needed to interact with the caller, such as what to say, what information to collect, and how to respond to the caller. FIGS. 8-10 illustrate script editing interfaces for use by the user to generate or edit different types of scripts. FIG. 8 illustrates a "take a message" script editing interface 160 for a "take a message" type script, in accordance with example embodiments of the present disclosure. The "take a message" type script is used when the live agent is to take a message from a caller. In an example embodiment, the "take a message" script editing interface 160 includes an unavailable person prompt 162, in which the user can input the name of the person the caller is trying to reach. The "take a message" script editing interface 160 further includes a set of standard questions 164 for the live agent to ask the caller in order to take a message. In certain example embodiments, the "take a message" script editing interface 160 includes one or more instructional prompts 166 in which the user can input what the live agent should say should certain situations arise, or if there are any additional information or instructions of which the user would like the live agent to be aware. In practice, the interface 160 may include many other and/or different types of information collecting prompts than those illustrated in FIG. 8.

FIG. 9 illustrates a "gather information" script editing interface 170 for a "gather information" type script, in accordance with example embodiments of the present disclosure. The "gather information" type script is used when the live agent is to collect certain information from a caller through a series of questions. In an example embodiment, the "gather information" script editing interface 170 includes a desired action prompt 172, in which the user can input the purpose for gathering information, which the live agent will recite to the caller. The "gather information" script editing interface 170 further includes a set of standard questions 174 for the live agent to ask the caller in order facilitate the call. The "gather information" script editing interface 170 also includes one or more additional question prompts 176, in which the user can input one or more questions for the live agent to ask the caller. In certain example embodiments, the "gather information" script editing interface 170 includes one or more instructional prompts 178, in which the user can input what the live agent should say should certain situations arise, or if there are any additional information or instructions of which the user would like the live agent to be aware. In practice, the interface 170 may include many other and/or different types of prompts than those illustrated in FIG. 9.

FIG. 10 illustrates a "book appointment" script editing interface 180 for a "book appointment" type script, in accordance with example embodiments of the present disclosure. The "book appointment" type script is used when the live agent is to book an appointment with the entity 104 for the caller. In an example embodiment, the "book appointment" script editing interface 180 includes one or more desired appointment prompts 182, in which the user can input the type of appointment to be scheduled, which the live agent will recite to the caller when appropriate. The "book appointment" script editing interface 180 further includes a set of standard questions 184 for the live agent to ask the caller in order to facilitate the call. The "book appointment" script editing interface 180 also includes a calendar selection dropdown 176, in which the user can input one or more calendars on which to book the appointment. In certain example embodiments, one or more calendars associated with appointment availability for the entity can be integrated or synced between the entity 104 and the communication routing platform 102 such that the live agents can access up-to-date calendars. The "book appointment" script editing interface 180 may further include one or more instructional prompts 188, in which the user can input what the live agent should say should certain situations arise, or if there are any additional information or instructions of which the user would like the live agent to be aware. In practice, the interface 180 may include many other and/or different types of prompts than those illustrated in FIG. 10.

Figure 11:
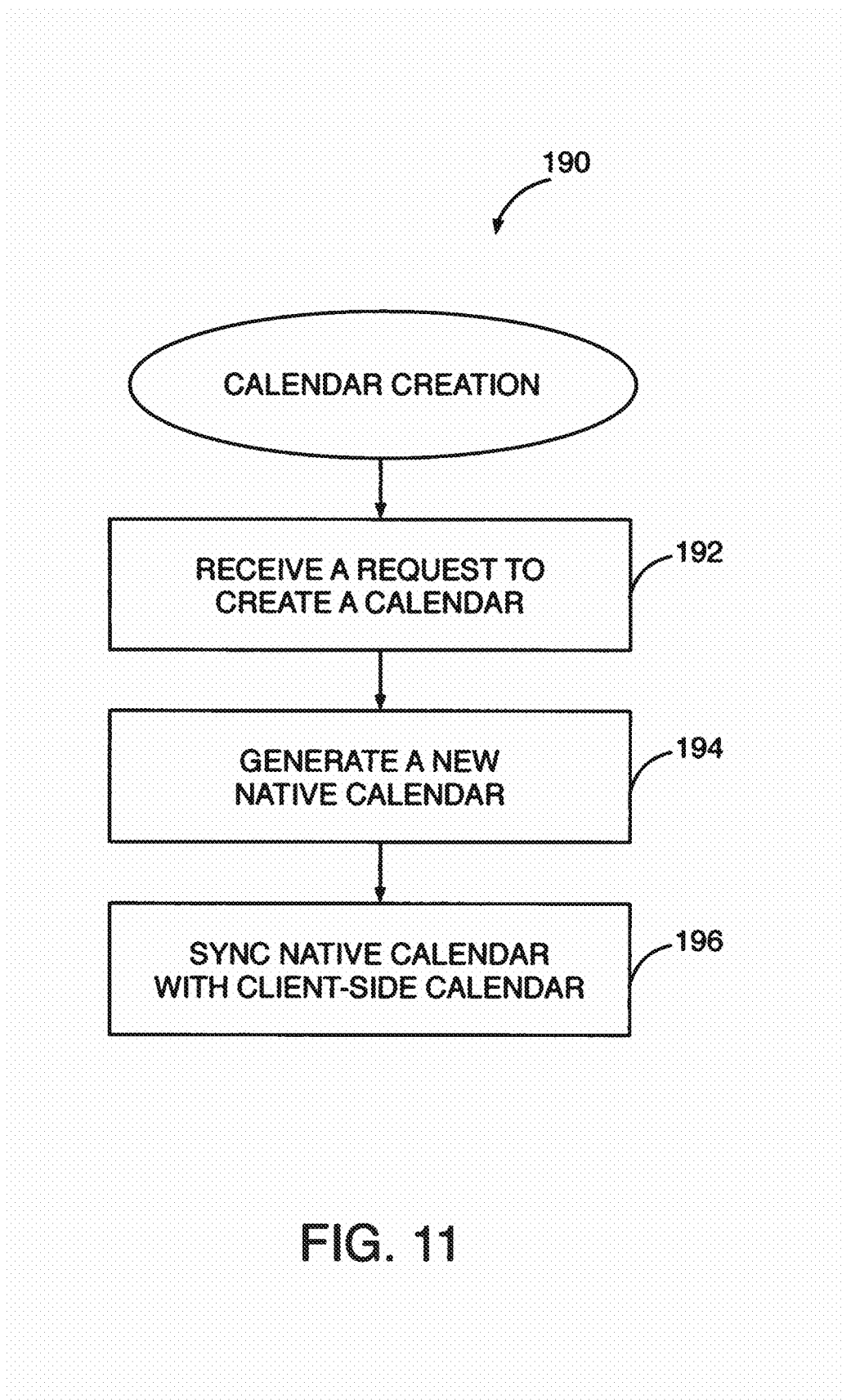
FIG. 11 illustrates in further detail a process of generating a calendar function within the communication routing platform, in accordance with example embodiments of the present disclosure.

FIG. 11 illustrates in further detail a process of generating a calendar function 190 within the communication routing platform 102, in accordance with example embodiments of the present disclosure. In certain example embodiments, the process 190 includes receiving, by the communication routing platform, a request to create an appointment booking calendar within the communication routing platform 102 (step 192). The request may be a selection or input made by the user via a client-side interface. In certain example embodiments, the request may be initiated in the "book appointment" script editing interface 180. The process 190 further includes generating, by the communication routing platform (step 194), a new native calendar associated with the entity 104 and a specific script. In certain example embodiments, the same native calendar can be associated with multiple scripts. The process 190 further includes syncing the native calendar with a client-side calendar (step 196). The client-side calendar may be any electronic calendar used by the entity 104 to book appointments offline from the communication routing platform 102. Such client-side calendars may be based in any existing or new calendar software application, including those provided by a third party. Once the client-side calendar and the native calendar are synchronized, changes made on either end will be reflected on both calendars.

Figure 12:
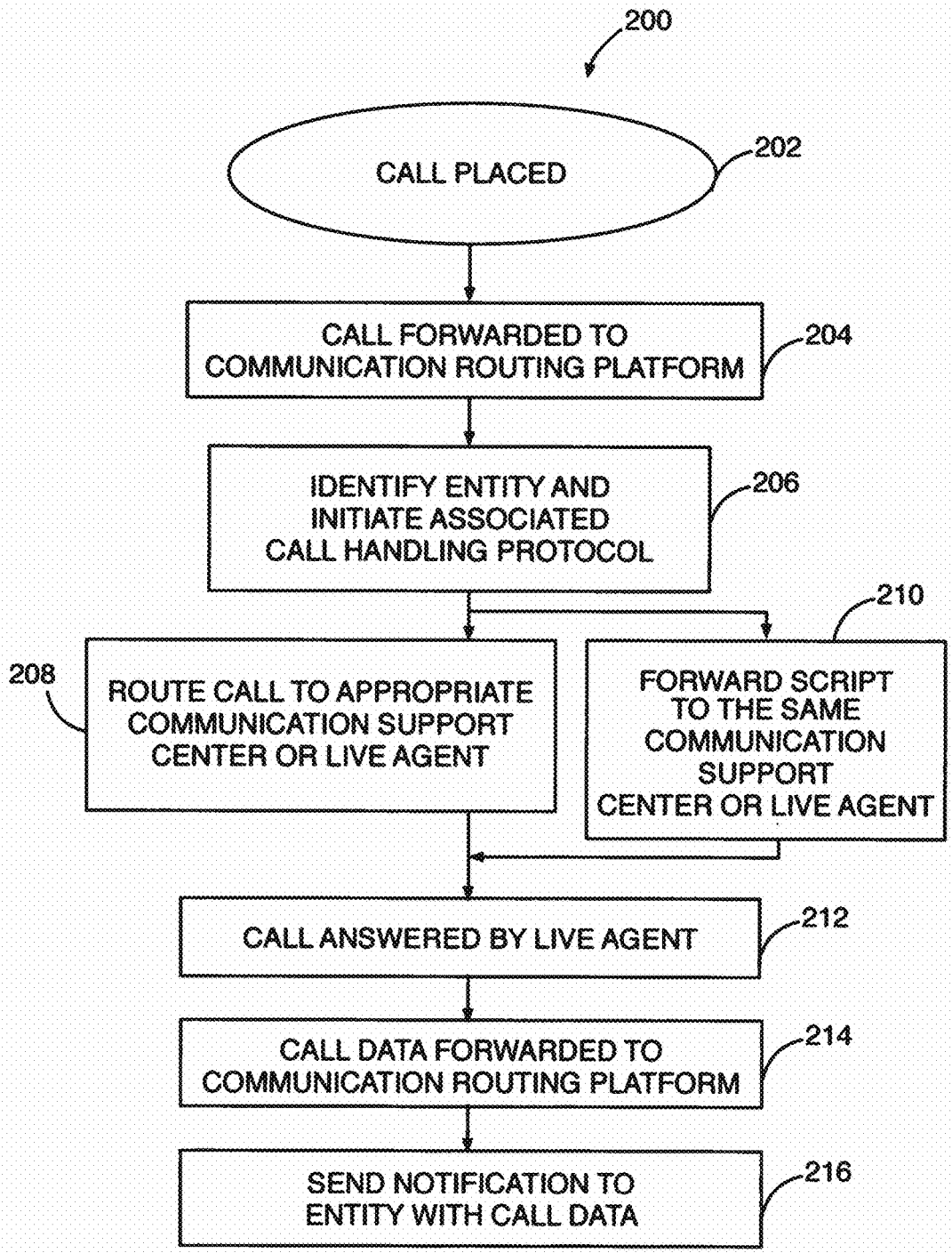
FIG. 12 is a flowchart illustrating a generic process of handling a call through the communication routing platform.

After an account and at least one call handling protocol is set up for an entity 104, the communication routing platform 102 can be utilized to route incoming calls from the entity 104 to a live agent. FIGS. 12-19 illustrate the handing of calls forwarded from an entity to the communication routing platform 102. FIG. 12 is a flowchart illustrating a generic process of handling a call 200 through the communication routing platform 102. In certain example embodiments, the process is initiated when a call is place by a caller (step 202). Subsequently, the call is forwarded to the communication routing platform 102 (step 204). In certain example embodiments, the phone number dialed by the caller when placing the call is an internet-based phone number provided by the communication routing platform 102, either natively or through a third party Internet telephony provider. Thus, the call is placed directly to the communication routing platform 102. In other example embodiments, the phone number dialed by the caller is an existing traditional telephone number. In such an embodiment, the receiving phone or call receiving system is configured to forward the call through to the communication routing platform 102 via an internet-based phone number assigned to the entity 104 by the communication routing platform 102. Once the call is received by the communication routing platform 102, the entity 104 associated with the internet-based phone number through which the call was received is identified by the communication routing platform 102 (step 206). Thus, the corresponding call handling protocol or script associated with that entity or phone number is initiated as well. The call is then routed to an appropriate communication support center or independent live agent (step 208). The associated call handling protocol or script is simultaneously sent to the same center or live agent (step 210). Thus, as the live agent answers the call, he or she also has access to the associated call handing protocol or script. In certain example embodiments, the call is forwarded to a specific center or agent based on instructions associated with the entity 104. Accordingly, the receiving live agent subsequently answers the call (step 212). During the call, the live agent may input various data from the caller or notes regarding the call. Such call data is then forwarded back to the communication routing platform 102 by the live agent (step 214). In certain example embodiments, the call data is provided to the communication routing platform 102 as raw data via an API. In such embodiments, the call data is then processed by the communication routing platform 102 and delivered to the entity 104 in one or more formats and through one or more communication channels such as email, voicemail, SMS messaging, account update, notification, and the like (step 216).

Figure 13:
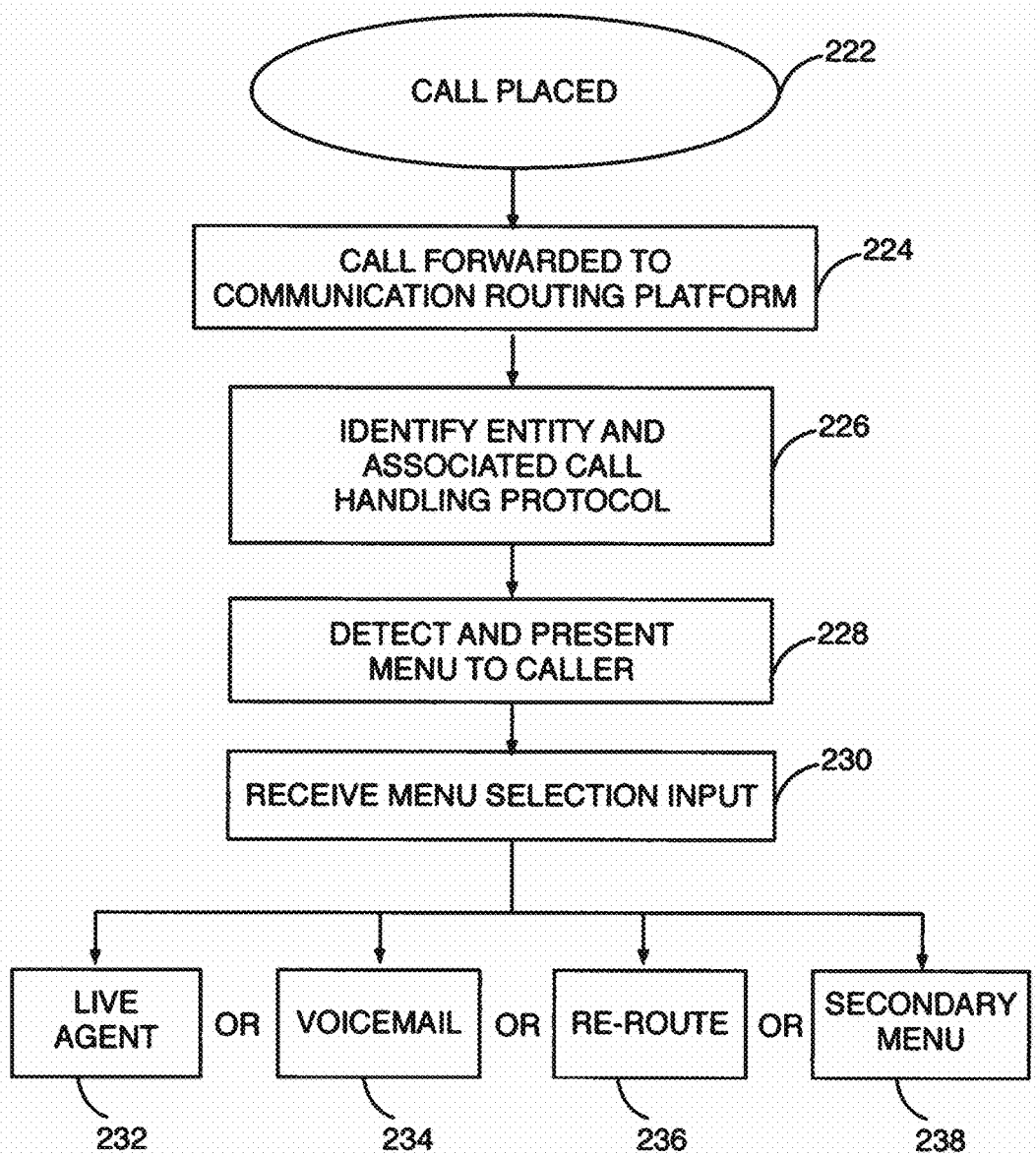
FIG. 13 is a flow chart illustrating a process for handing a call in which the associated call handling protocol includes a menu, in accordance with example embodiments of the present disclosure.

FIG. 13 is a flow chart illustrating a process for handing a call in which the associated call handling protocol includes a menu 220, in accordance with example embodiments of the present disclosure. The process is initiated when a call is placed by a caller (step 222). Subsequently, the call is forwarded to the communication routing platform 102 (step 224). Once the call is received by the communication routing platform 102, the entity 104 associated with the internet-based phone number through which the call was received and the corresponding call handing protocol are identified by the communication routing platform 102 (step 226). In the present embodiment, a menu is detected and presented to the caller (step 228). In certain example embodiments, the menu is presented to the caller via an interactive voice response (IVR) program. The communication routing platform 102 then receives a menu selection from the caller (step 230). In certain example embodiments, the caller can choose one of a plurality of menu options, such as but not limited to, to speak with a live agent 232, leave a voicemail 234, reroute to another number 236, or access a secondary menu 238. In certain example embodiments, each menu option is associated with another internet-based phone number to which the call is forwarded when that menu option is selected, and each internet-based phone number is also associated with another protocol which is carried out when accessed.

Figure 14:
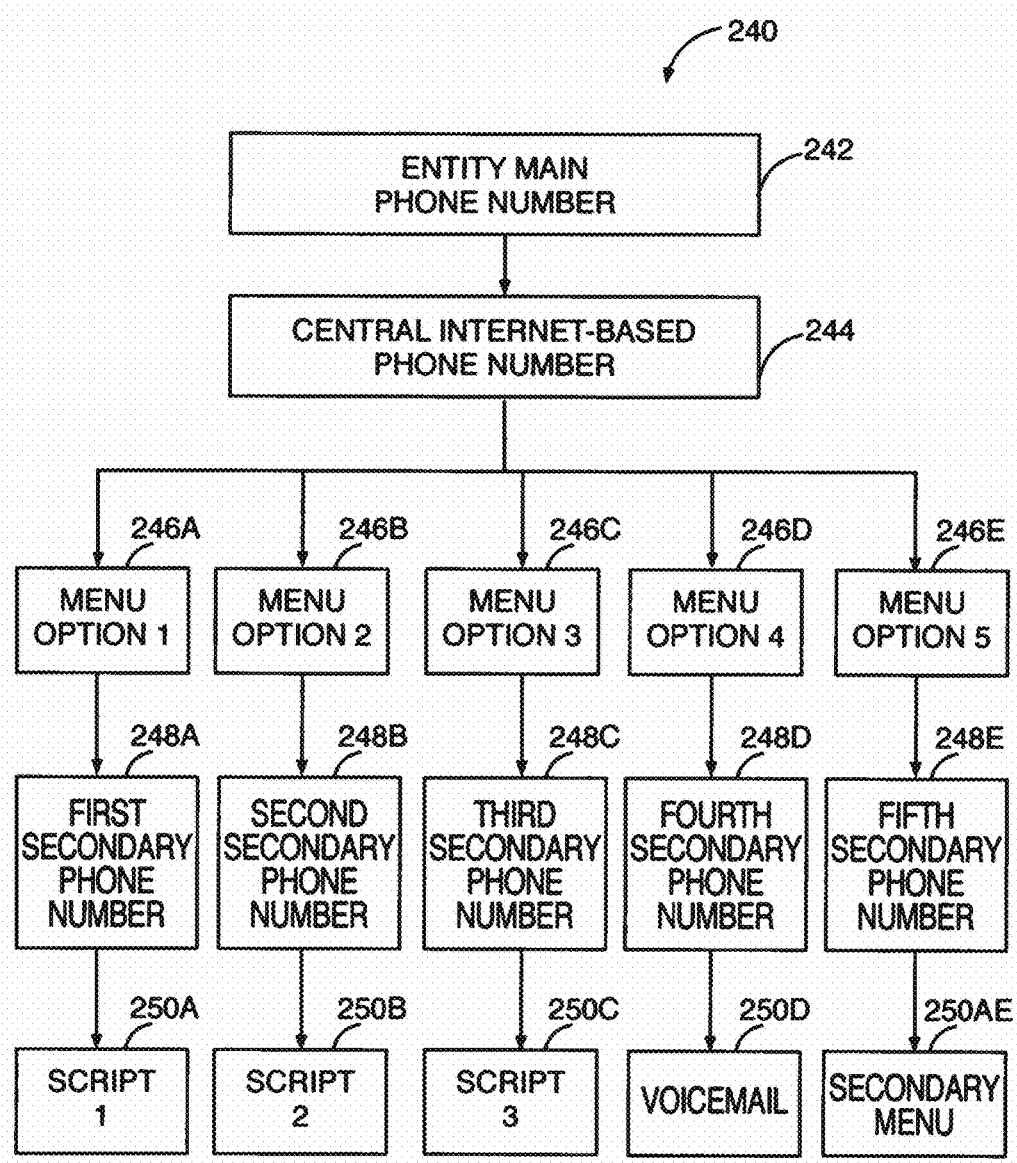
FIG. 14 illustrates a diagram of call menu handling, in accordance with example embodiments of the present disclosure.

FIG. 14 illustrates a diagram of call menu handling 240, in accordance with example embodiments of the present disclosure. In certain example embodiments, a call is received through the existing or traditional entity phone number 242, and then forwarded to the central internet-based phone number 244 assigned by the communication routing platform 102. The caller is then presented with a plurality of menu options 246a-e. Each of the plurality of menu options is associated with a unique secondary internet-based phone number 248a-e. Selection of a particular menu option by the caller forwards the call on to the associated secondary internet-based phone number 248a-e. The internet-based phone number is how the communication routing platform 102 identifies which actions or call handling protocol to carry out. Accordingly, each secondary internet-based phone number 248a-e is associated with and initiates a unique call handling protocol 250a-e. Thus, if a caller selects a first menu option 246a, the call is forwarded to a first secondary internet-based phone number 248a, and a first call handling protocol 250a is initiated. In certain example embodiments, the call handling protocols 250a-e can include a variety of different actions or scripts. For example, three of the call handling protocols 250a-c forward the call to a live agent along with associated scripts, a fourth call handing protocol 250d forwards the call to an automatic voicemail, and a fifth call handling protocol 250e activates a secondary menu. Likewise, each menu option within the secondary menu includes its own unique internet-based phone number and operates similarly as described above.

Figure 15:
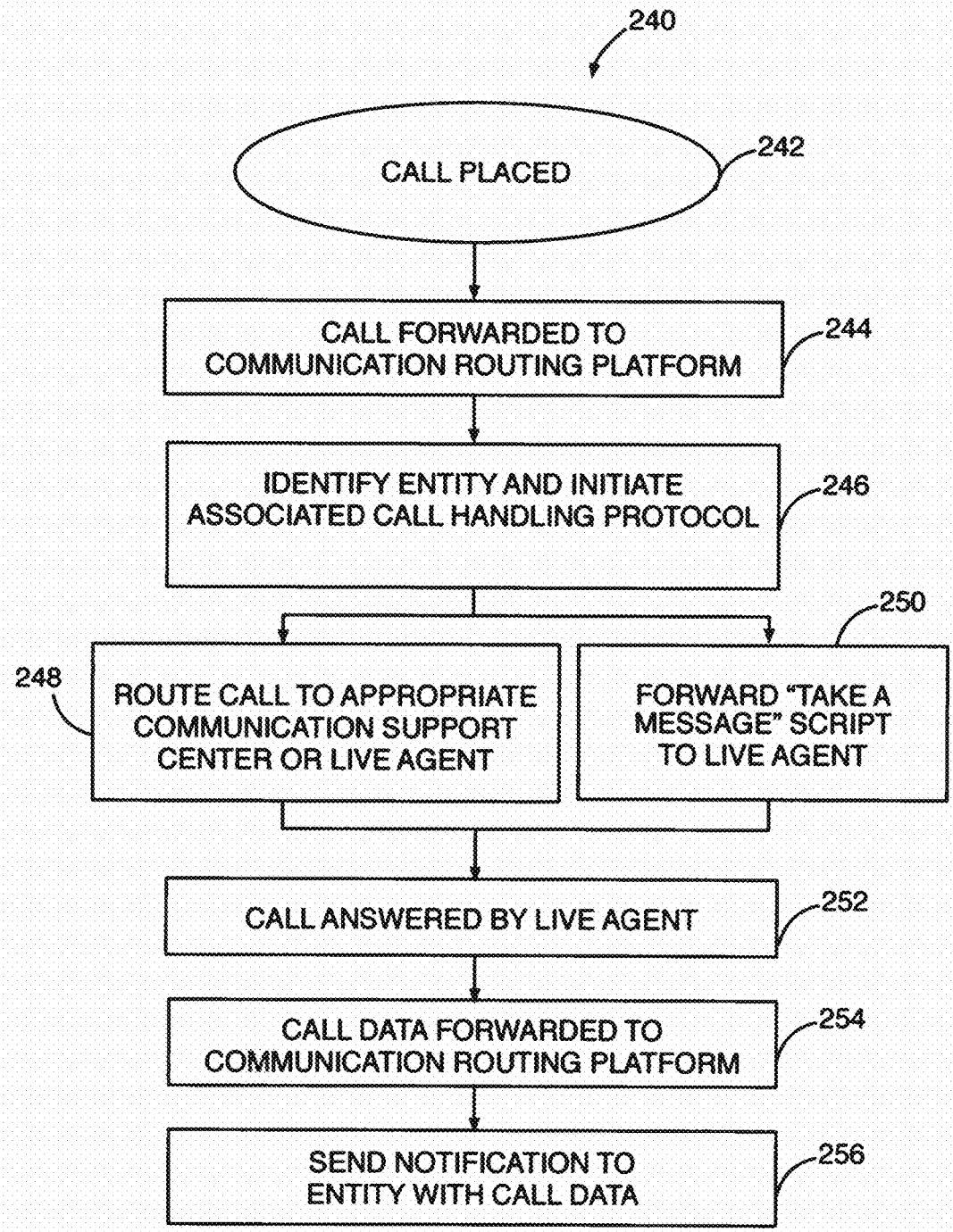
FIG. 15 is a flow chart illustrating a process for handling a call with a "take a message" type script, in accordance with example embodiments of the present disclosure.

FIG. 15 is a flow chart illustrating a process for handling a call with a "take a message" type script 240, in accordance with example embodiments of the present disclosure. In certain example embodiments, the process 240 is initiated when a call is place by a caller (step 242). Subsequently, the call is forwarded to the communication routing platform 102 (step 244). Once the call is received by the communication routing platform 102, the entity 104 associated with the internet-based phone number through which the call was received is identified by the communication routing platform 102 (step 246). Thus, the corresponding call handling protocol associated with that entity or phone number is identified as well. In this embodiment, the call handling protocol dictates that the call be forwarded to a live agent with the "take a message" script previously generated for this Internet-based phone number. The call is then forwarded to an appropriate communication support center 106 or independent live agent (step 248). The "take a message script" is simultaneously sent to the same center or live agent (step 250). Thus, as the live agent answers the call, he or she also has access to the appropriate script. Accordingly, the receiving live agent subsequently answers the call (step 252) and prompts the caller to leave a message. During the call, the live agent enters the message into the agent-side interface. The message and other relevant call data is then forwarded back to the communication routing platform 102 by the live agent (step 254). The message and call data is then processed by the communication routing platform 102 and delivered to the entity 104 in one or more formats and through one or more communication channels such as email, voicemail, SMS messaging, account update, notification, and the like (step 256).

Figure 16:
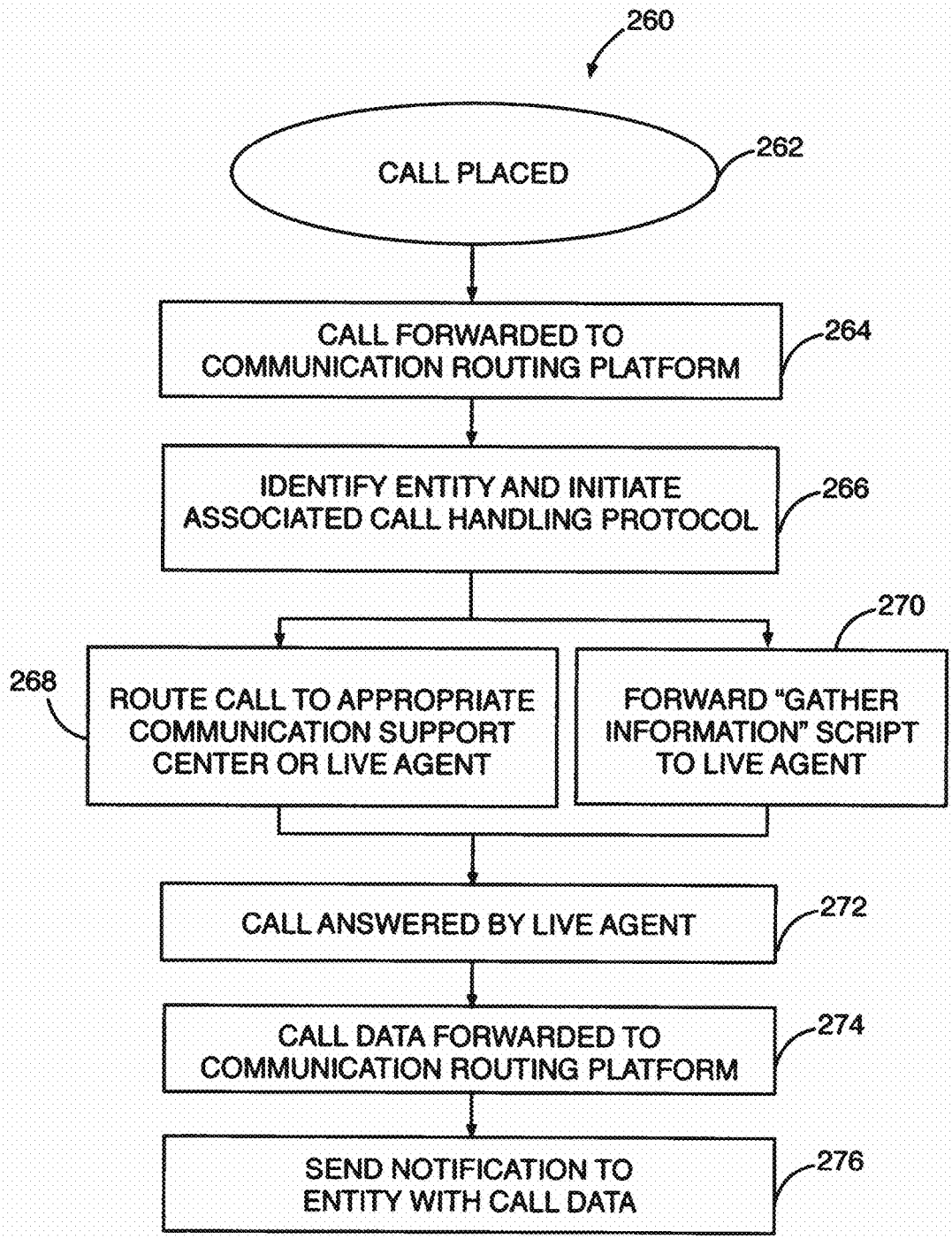
FIG. 16 is a flow chart illustrating a process for handling a call with a "gather information" type script, in accordance with example embodiments of the present disclosure.

FIG. 16 is a flow chart illustrating a process for handling a call with a "gather information" type script 260, in accordance with example embodiments of the present disclosure. In certain example embodiments, the process 260 is initiated when a call is placed by a caller (step 262). Subsequently, the call is forwarded to the communication routing platform 102 (step 264). Once the call is received by the communication routing platform 102, the entity 104 associated with the internet-based phone number through which the call was received is identified by the communication routing platform 104 (step 266). Thus, the corresponding call handling protocol associated with that entity 104 or phone number is identified as well. In this embodiment, the call handling protocol dictates that the call be forwarded to a live agent with the "gather information" script previously generated for this internet-based phone number. The call is then forwarded to an appropriate communication support center 106 or independent live agent (step 268). The "gather information" script is simultaneously sent to the same center or live agent (step 270). Thus, as the live agent answers the call, he or she also has access to the appropriate script. Accordingly, the receiving live agent subsequently answers the call (step 272) and asks the caller questions as directed by the script. During the call, the live agent enters the caller's responses into the agent-side interface. The response data and other relevant call data is then forwarded back to the communication routing platform 102 by the live agent (step 274). The responses and call data are then processed by the communication routing platform 102 and delivered to the entity 104 in one or more formats and through one or more communication channels such as email, voicemail, SMS messaging, account update, notification, and the like (step 276).

Figure 17:
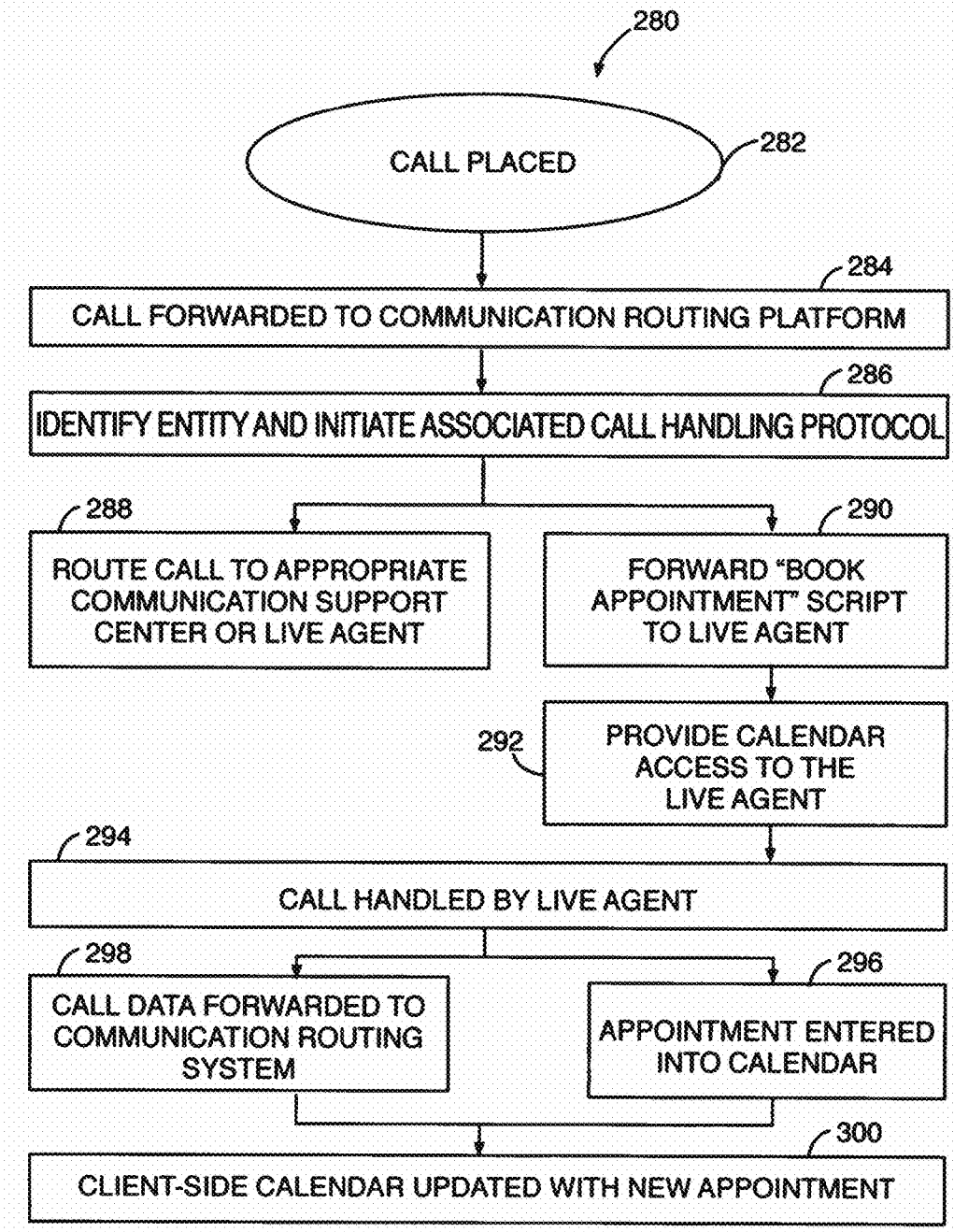
FIG. 17 is a flow chart illustrating a process of handling a call with a "book appointment" type script, in accordance with example embodiments of the present disclosure.

FIG. 17 is a flow chart illustrating a process of handling a call with a "book appointment" type script, in accordance with example embodiments of the present disclosure. In certain example embodiments, the process 280 is initiated when a call is placed by a caller (step 282). Subsequently, the call is forwarded to the communication routing platform 102 (step 284). Once the call is received by the communication routing platform 102, the entity 104 associated with the internet-based phone number through which the call was received is identified by the communication routing platform 102 (step 286). Thus, the corresponding call handling protocol associated with that entity 104 or phone number is identified as well. In this embodiment, the call handling protocol dictates that the call be forwarded to a live agent with the "book appointment" script previously generated for this internet-based phone number. The call is then forwarded to an appropriate communication support center 106 or independent live agent (step 288). The "book appointment" script is simultaneously sent to the same center or live agent (step 290). Thus, as the live agent answers the call, he or she also has access to the appropriate script.

In certain example embodiments, the process further includes providing the associated calendar to the live agent (step 292) such that the live agent can see which appointment times are available and enter an appointment into the calendar. In certain example embodiments, this step includes providing raw data from a client-side calendar to an agent-side calendar via an API. In certain example embodiments, the data from the client-side calendar is processed by the communication routing platform 102, in which personally identifiable information is removed and the only information provided through to the client-side calendar is whether or not a time slot is available for booking. Thus, personally identifiable information is kept confidential. The live agent, having received the call, the "book appointment" script, and access to associated calendars, answers the call and works out an appointment time with the caller (step 294). Once an appointment time is agreed upon, the live agent enters the appointment into the agent-side calendar, which may be a part of the script (step 296). Any recorded call data, including the booked appointment, is transmitted to the communication routing platform 102 to be processed and sent to the entity 104 accordingly (step 298). Additionally, the appointment data is sent to the client-side calendar and the client-side calendar is updated with the appointment (step 300). In certain example embodiments, the appointment data is entered into the native calendar within the communication routing system 102 by the live agent, and the native calendar is then synced with the client-side calendar.

Figure 18:
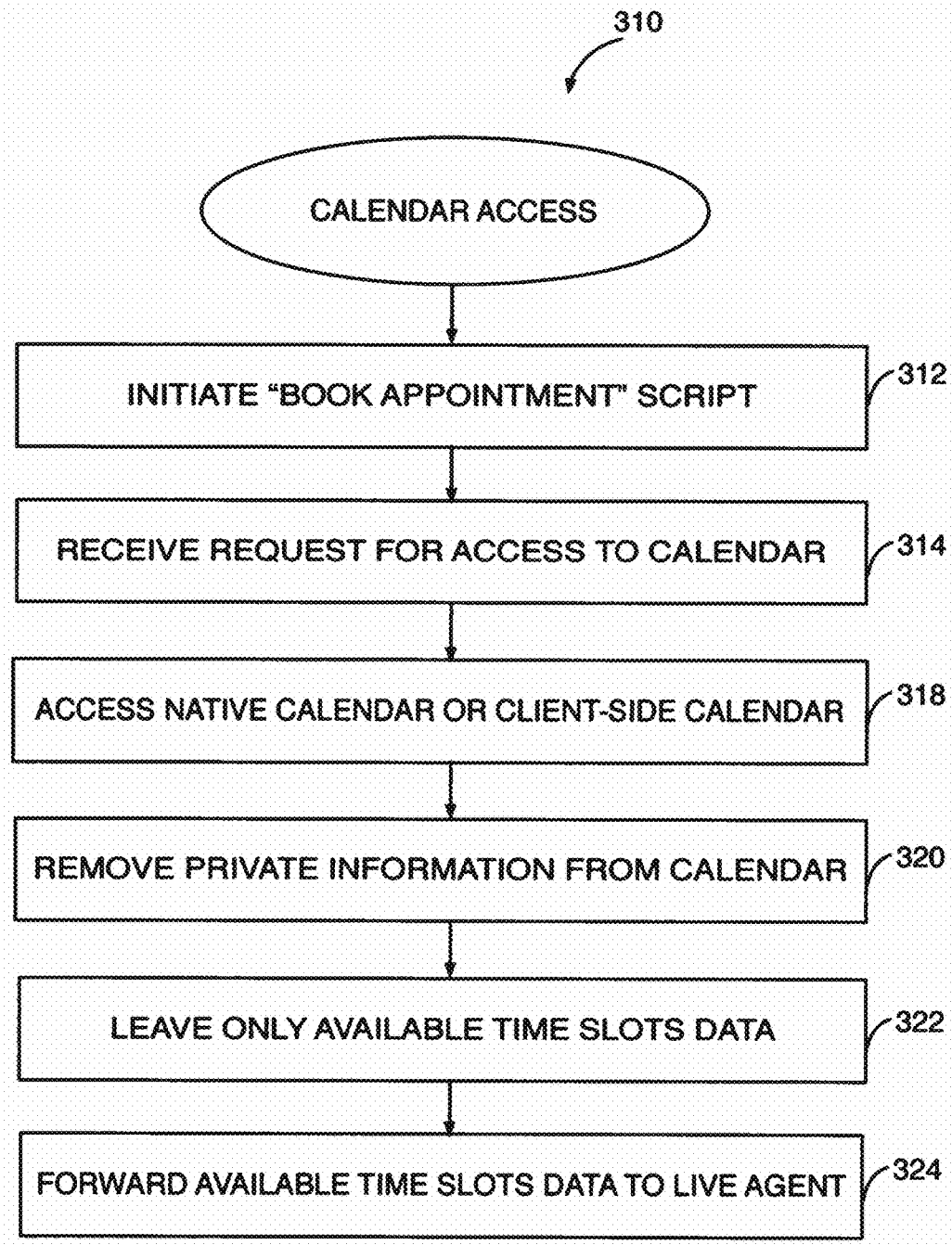
FIG. 18 is a flowchart illustrating a process of providing access to calendar information to a live agent, in accordance with example embodiments of the present disclosure.

FIG. 18 is a flowchart illustrating a process of providing access to calendar information to a live agent 310, in accordance with example embodiments of the present disclosure. The process 310 begins when a "book appointment" script is initiated (step 312). In certain example embodiments, the process includes receiving, by the communication routing platform 102, a request for access to a client calendar (step 314). The request may be made automatically when the script is initiated or upon further input by the live agent. For example, multiple calendars may be associated with a script, and the live agent requests access to one of the multiple calendars based on caller selection. When the communication routing platform 102 receives the request, it accesses the corresponding native calendar within the communication routing platform 102 or the client-side calendar (Step 318) and collects the calendar data. Any private or personally identifiable information contained with the calendar data is detected and removed (320), leaving only available time slot data (step 322). Thus, only available time slots are provided to the live agent (step 324) via the communication routing platform 102.

Figure 19:
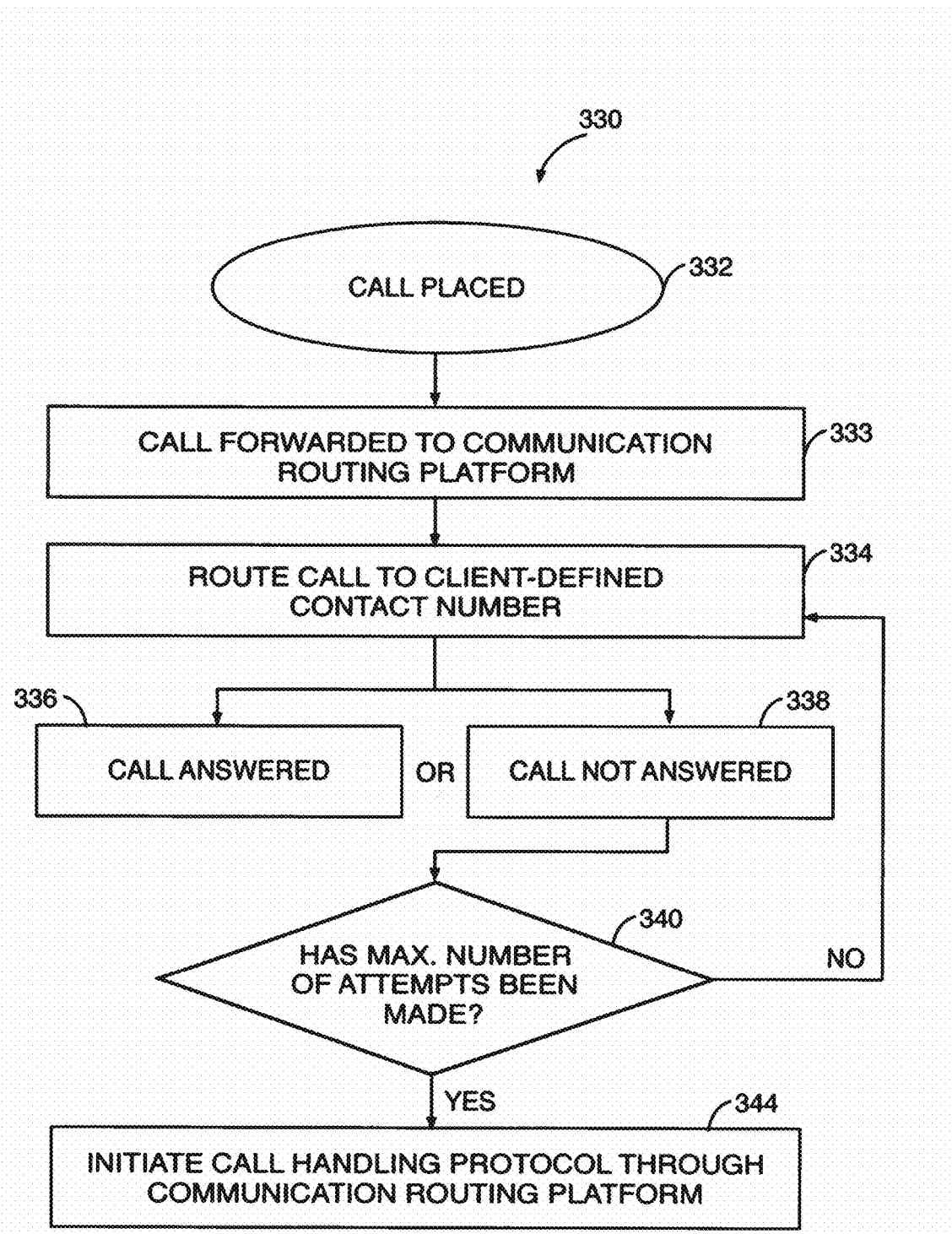
FIG. 19 is a flow chart illustrating a process of handling client-side forwarding, in accordance with example embodiments of the present disclosure.

In certain example embodiments, the communication routing platform 102 can also be configured to forward calls to a designated client-side contact, such as a traditional landline or cellular number that may be answered by a user representing the entity 104. The communication routing platform 102 can be configured to handle the call through the communication routing platform 102 if the client-side contact number is not answered within a certain number of attempts. FIG. 19 is a flow chart illustrating a process of handling client-side forwarding 330, in accordance with example embodiments of the present disclosure. The process 330 is initiated when a call is placed (step 332) and forwarded to the communication routing platform 102 (step 102). The process 330 further includes forwarding, by the communication routing platform 102, to a client-side contact number (step 334). The call may be answered (step 336) or go unanswered (step 338). If the call is not answered (step 338), the communication routing platform 102 determines if the maximum number of attempts has been made to reach the client-side contact (step 340). If the maximum number of attempts has not been made, the communication routing platform 102 forwards the call to the client-side contact number again (step 334). The communication routing platform 102 can be configured to try a second or third client-side contact as well. If the maximum number of attempts has been made unsuccessfully, then the call is handled through the communication routing platform 102 and the associated call handling protocol is initiated (step 344). This may include forwarding the call to a live agent, accessing a menu, providing a voicemail, or any other call handling action as described in the present disclosure.

Although the inventions are described with reference to example embodiments, it should be appreciated by those skilled in the art that various modifications are well within the scope of the invention. From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the example embodiments, equivalents of the elements shown therein will suggest themselves to those skilled in the art, and ways of constructing other embodiments of the present invention will suggest themselves to practitioners of the art. Therefore, the scope of the present invention is not limited herein.

We claim:

1. A processor-implemented method of receiving and routing communication requests, comprising:
   receiving, by a communication routing platform, an incoming communication from a sender, wherein the incoming communication is directed towards an entity having a unique identifier that is uniquely associated with a script;
   identifying, by the communication routing platform, an account associated with the entity;
   carrying out, by the communication routing platform, a primary communication handling protocol associated with the account, wherein the primary communication handling protocol comprises one or more next steps for forwarding the incoming communication to an agent or call center; and
   sending, by the communication routing platform, one or more notifications to the entity, the one or more notifications comprising data generated during carrying out of the primary communication handling protocol,
   wherein the primary communication handling protocol comprises forwarding the script to the agent or call center when the incoming communication is forwarded, wherein the script is associated with the account, and wherein the script provides the agent or call center with user-defined instructions for interacting with the sender, and
   wherein the script is generated according to a script setup process comprising:
      prompting a user to define one or more parameters of the script through a script setup interface, wherein the script setup interface is accessible to the user via an internet capable and processor-implemented device;
      receiving one or more inputs to the script setup interface:
      updating the script according to the inputs; and
      forwarding the updated script to a subsequent agent or call center for a subsequent communications request directed towards the entity.

2. The processor-implemented method of claim 1, wherein the primary communication handling protocol comprises:
   providing a plurality of menu options to the sender, wherein each option of the plurality of menu options initiates a secondary communication handling protocol.

3. The processor-implemented method of claim 2, wherein each secondary communication handling protocol is associated with a unique secondary platform-provided phone number, and initiating a first secondary communication handling protocol comprises forwarding the incoming communication to a first secondary platform-provided phone number.

4. The processor-implemented method of claim 1, wherein the incoming communication is received on a central platform-provided phone number assigned to the entity and tied to the account, wherein the account associated with the entity is identified by the central platform-provided phone number on which the incoming communication was received.

5. The processor-implemented method of claim 1, wherein the incoming communication is forwarded to a live agent based on language or region.

6. The processor-implemented method of claim 1, wherein the primary communication protocol is generated through an initial protocol setup process, the protocol setup process comprising:
- prompting a user to define one or more parameters of the primary communication protocol through a protocol setup interface, wherein the protocol setup interface is accessible to the user via an internet capable and processor-implemented device;
- receiving one or more inputs on the protocol setup interface; and
- updating the primary communication protocol according to the inputs.

7. The processor-implemented method of claim 1, wherein the script instructs a live agent to book an appointment for the sender on a client calendar, wherein available time slots on the client calendar are forwarded to the live agent with the script by the communication handling platform, and wherein an appointment time booked by the live agent for the sender is sent to the client calendar via the communication routing platform.

8. The processor-implemented method of claim 1, wherein the primary communication handling protocol comprises:
- forwarding the incoming communication to a designated contact external to the communication routing platform;
- initiating a secondary communication handling protocol when the incoming communication is not answered by the designated contact within a predetermined number of attempts.

9. A processor-implemented system for routing communications, the system comprising:
a communication router configured to:
- receive an incoming communication from a sender, wherein the incoming communication is directed towards an entity having a unique identifier that is uniquely associated with a script;
- identify an account associated with the entity;
- carry out a primary communication handling protocol associated with the account, wherein the primary communication handling protocol comprises one or more next steps for forwarding the incoming communication to an agent or call center; and
- send one or more notifications to the entity, the one or more notifications comprising data generated during carrying out of the primary communication handling protocol,
wherein the primary communication handling protocol comprises forwarding the script to the agent or call center when the incoming communication is forwarded, wherein the script is associated with the account, and wherein the script provides the agent or call center with user-defined instructions for interacting with the sender, and
wherein the script is generated according to a script setup process comprising:
- prompting a user to define one or more parameters of the script through a script setup interface, wherein the script setup interface is accessible to the user via an internet capable and processor-implemented device;
- receiving one or more inputs to the script setup interface;
- updating the script according to the inputs; and
- forwarding the updated script to a subsequent agent or call center for a subsequent communications request directed towards the entity.

10. The processor-implemented system of claim 9, wherein as a part of the primary communication handling protocol, the call router is configured to:
- forward the incoming communication to a live agent, and forward a script to the live agent when the incoming communication is forwarded to the live agent, wherein the script is associated with the account, and wherein the script provides the live agent with user-defined instructions for communicating with the sender;
- forward the incoming communication to a message center;
- forward the incoming communication to a client-side contact;
- or any combination thereof.

11. The processor-implemented system of claim 9, wherein the incoming communication is received on a central router-provided phone number assigned to the entity and tied to the account, wherein the account associated with the entity is identified by the central platform-provided phone number on which the incoming communication was received.

12. The processor-implemented system of claim 11, wherein the central router provided phone number is an internet based phone number.

13. The processor-implemented system of claim 9, wherein the primary communication protocol is generated through an initial protocol setup process, wherein the communication router:
- prompts a user to define one or more parameters of the primary communication protocol through a protocol setup interface, wherein the protocol setup interface is accessible to the user via an internet capable and processor-implemented device;
- receives one or more inputs to the protocol setup interface; and
- updates the primary communication protocol according to the inputs.

14. A processor-implemented method of receiving and routing calls to a call center or agent, comprising:
- receiving, by a communication routing platform, an incoming call from a caller, wherein the incoming communication is directed to a central platform-provided phone number that is uniquely associated with a script;
- identifying, by the communication routing platform, an account and an entity associated with the platform-provided phone number;
- carrying out, by the communication routing platform, a primary communication handling protocol associated with the account or central platform-provided phone number, wherein the primary communication handling protocol comprises one or more next steps for forwarding the incoming call to an agent or call center; and
- sending, by the communication routing platform, one or more notifications to the entity, the one or more notifications comprising data generated during carrying out of the primary communication handling protocol,
wherein the primary communication handling protocol comprises forwarding the script to the agent or call center when the incoming communication is forwarded, wherein the script is associated with the account, and wherein the script provides the agent or call center with user-defined instructions for interacting with the sender, and wherein forwarding the script to the agent or call center comprises sending raw script data to an agent-side system via an Application Programming Interface, and populating an interface on the agent-side system with the raw script data.

15. The method of claim 14, wherein the primary communication handling protocol comprises any combination of:

forwarding the incoming call to a voicemail center;

forwarding the incoming communication to a client-side phone number; and providing a plurality of menu options to the caller, wherein each option of the plurality of menu options initiates a unique secondary communication handling protocol.

16. The method of claim 15, wherein the incoming call is forwarded to the call center or live agent based on region, language, a random selection scheme, a round robin selection scheme, or a predetermined forwarding destination assigned to the central platform provided phone number.

17. A processor-implemented system for routing communications, the system comprising:

a communication router configured to:

receive an incoming communication from a sender, wherein the incoming communication is directed towards an entity having a unique identifier that is uniquely associated with a script;

identify an account associated with the entity;

carry out a primary communication handling protocol associated with the account, wherein the primary communication handling protocol comprises one or more next steps for forwarding the incoming communication to an agent or call center; and send one or more notifications to the entity, the one or more notifications comprising data generated during carrying out of the primary communication handling protocol, wherein the primary communication handling protocol comprises forwarding the script to the live agent or call center when the incoming communication is forwarded to the live agent, wherein the script is associated with the account, and wherein the script provides the live agent or call center with user-defined instructions for interacting with the sender, and wherein forwarding the script to the live agent or call center comprises sending raw script data to an agent-side system via an Application Programming Interface, and populating an interface on the agent-side system with the raw script data.

* * * * *